United States Patent
Chung et al.

(10) Patent No.: US 6,583,845 B1
(45) Date of Patent: Jun. 24, 2003

(54) LIQUID CRYSTAL DISPLAY DEVICE AND METHOD OF FABRICATING THE SAME

(75) Inventors: Nag Su Chung, Kumi (KR); Ju Sung Cho, Kumi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 452 days.

(21) Appl. No.: 09/585,399

(22) Filed: Jun. 2, 2000

(30) Foreign Application Priority Data

Feb. 23, 2000 (KR) .................................. 2000-08667

(51) Int. Cl.[7] .......................... G02F 1/1345; H05K 7/10
(52) U.S. Cl. ..................... 349/150; 349/149; 361/769
(58) Field of Search ..................... 349/150, 152, 349/149; 361/749, 777; 174/250

(56) References Cited

U.S. PATENT DOCUMENTS 5,889,572 A * 3/1999 Takahashi et al. .......... 349/149
6,323,930 B1 * 11/2001 Higuchi et al. ............. 349/152

* cited by examiner

*Primary Examiner*—Toan Ton
*Assistant Examiner*—Dung Nguyen
(74) *Attorney, Agent, or Firm*—McKenna, Long & Aldridge LLP

(57) ABSTRACT

A liquid crystal display having dummy pads that are capable of fortifying a bonding force between a tape carrier package and a liquid crystal panel. In the liquid crystal display, the tape carrier package has first and second dummy pads to which signals are not applied. The first dummy pad has a larger width than the second dummy pad. The liquid crystal panel has third and fourth dummy pads corresponding to the first and second dummy pads, respectively.

9 Claims, 6 Drawing Sheets

CENVENTIONAL ART

LIQUID CRYSTAL DISPLAY DEVICE AND METHOD OF FABRICATING THE SAME

BACKGROUND OF THE INVENTION

This application claims benefit of Korean patent application number P2000-08667, filed Feb. 23, 2000, which is hereby incorporated by reference for all purposes as if fully set forth herein.

FIELD OF THE INVENTION

This invention relates to a liquid crystal display having a tape carrier package including a mounted integrated circuit, and more particularly to a tape carrier package with dummy pads that are capable of fortifying a bonding force in bonding the tape carrier package onto a liquid crystal panel. Also, the present invention is related to a method of fabricating a liquid crystal display with dummy pads that are capable of fortifying a bonding force between the tape carrier package and the liquid crystal panel.

DESCRIPTION OF THE RELATED ART

Generally, an active matrix liquid crystal display uses thin film transistors (TFTs) as switching devices to display a natural-looking moving picture. Since such a liquid crystal display can be made into a smaller-size device than a cathode ray tube, it is commercially viable for use as a monitor such as a portable television, lap-top personal computer or other consumer device.

The active matrix liquid crystal display displays a picture corresponding to video signals such as television signals on a pixel (or picture element) matrix having pixels arranged at each intersection between gate lines and data lines. Each pixel includes a liquid crystal cell for controlling a transmitted light quantity in accordance with a voltage level of a data signal from a data line. A TFT (thin film transistor) is installed at an intersection between a gate line and a data line to switch a data signal to be transferred to the liquid crystal cell in response to a scanning signal (i.e., a gate pulse) from the gate line.

Such a liquid crystal display requires a number of integrated circuits (ICs) connected to the data lines and the gate lines to apply data signals and scanning signals to the data lines and the gate lines, respectively. The ICs are installed between the print wiring board (PWB) and the liquid crystal panel to apply signals supplied from the PWB to the data lines and the gate lines. IC mounting methods include chip on board, hereinafter referred to as "COB", tape automated bonding, hereinafter referred to as "TAB", and chip on glass, hereinafter referred to as "COG". (Other methods are also possible.) The COB system is ainly used for a monochromatic liquid crystal display having a pixel pitch of more than 300 μm. As shown in FIG. 1, in this COB system, ICs 8 are mounted on a PWB 6 and a heat-seal connector 10 connects the PWB 6 and a glass substrate 3 in a liquid crystal panel 2. In this case, a back light unit 4 used as a light source is provided between the liquid crystal panel 2 and the PWB 6. As shown in FIG. 2, in the TAB system, ICs 14 are mounted on a tape carrier package (TCP) 12. The TCP 12 is connected between the PWB 6 and the liquid crystal panel 3. As shown in FIG. 3, in the COG system, an IC chip 20 is directly mounted on a glass substrate 17 in a liquid crystal panel 16.

The above mentioned TAB IC mounting method has been widely employed because it can widen an effective area of the panel and has a relatively simple mounting process.

As shown in FIG. 4, the TCP 12 employed in the TAB system includes a base film 22 on which is mounted an IC 14. The base film 22 is also provided with input and output pads 24 and 26 connected to input and output pins of the ICs 14. The input and output pads 24 and 26 have a two-layer structure in which copper(Cu) is plated with tin(Sn) for preventing an oxidation. Line widths of the input pads 24 are set to be larger than those of the output pads 26. As shown in FIG. 5, the input pads 24 of the base film 22 are connected, via an anisotropic conductive film (ACF) 30, to pads 28 on the PWB 6. The output pads 26 are also connected via the ACF 30 to pads 28 on the liquid crystal panel 2.

Recently, in order to fortify a bonding force between the liquid crystal panel and the TCP 42, separate dummy pads 50 and 52 have been provided at a liquid crystal panel 44 and a TCP 42 as shown in FIG. 6. The dummy pads 50 and 52 function to increase a bonding force between the TCP 42 and the liquid crystal panel 44 by widening a bonded area without being connected to a signal wiring. The dummy pads 50 and 52 are bonded to each other with the ACF 30 therebetween upon bonding the output pads 46 of the TCP 42 to the gate/data pads 48 of the liquid crystal panel 44. Line widths of the dummy pads 52 and 54 are set to be equal to those of the output pads 46 of the TCP 42 and the gate/data pads 48 of the liquid crystal panel 44. Accordingly, the bonding forces of each dummy pad 50 and 52 are the same.

However, the TCP 42 and the liquid crystal panel 44 having the conventional dummy pads have a problem in that, since the bonding forces of each dummy pad 50 and 52 are same, a bonding force generated by the dummy pads 50 and 52 is not satisfactory. As a result, in the liquid crystal display with the conventional dummy pads, the TCP 42 can be separated from the liquid crystal panel 44 due to an impact force applied from the exterior thereof in the course of its fabrication process or its usage. The conventional TCPs 12 and 42 have limited usefulness because of such weak bonding force.

SUMMARY OF THE INVENTION

Accordingly, it is an object of the present invention to provide a liquid crystal display having dummy pads with an increased bonding force between a tape carrier package and a liquid crystal panel.

A further object of the present invention is to provide a method of fabricating a liquid crystal display having dummy pads that with an increased bonding force between a tape carrier package and a liquid crystal panel.

In order to achieve these and other objects of the invention, a liquid crystal display with dummy pads according to one aspect of the present invention includes a tape carrier package including first and second dummy pads to which signals are not applied, the first dummy pad having a larger width than the second dummy pad; and a liquid crystal panel including third and fourth dummy pads corresponding to the first and second dummy pads, respectively.

A liquid crystal display with dummy pads according to another aspect of the present invention includes a tape carrier package including output pads for outputting signals from an integrated circuit and dummy pads to which signals are not applied, at least one of said dummy pads having a width different from the output pads; and a liquid crystal panel including dummy pads corresponding to said dummy pads.

A method of fabricating a liquid crystal display with dummy pads according to still another aspect of the present invention includes the steps of forming first and second dummy pads on the tape carrier package in such a manner that the first dummy pad has a width different from the second dummy pad; forming third and fourth dummy pads corresponding to the first and second dummy pads, respectively, on the liquid crystal panel; and bonding the tape carrier package on the liquid crystal panel in such a manner that the first and second dummy pads correspond to the third and fourth dummy pads, respectively.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
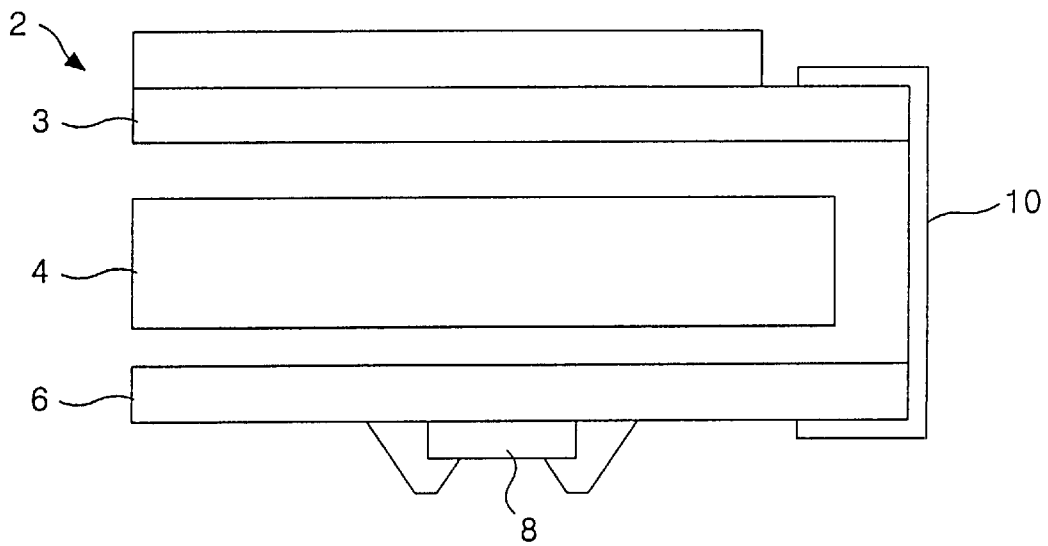
FIG. 1 is a sectional view showing the structure of a liquid crystal display employing the conventional chip on board system.
Figure 2:
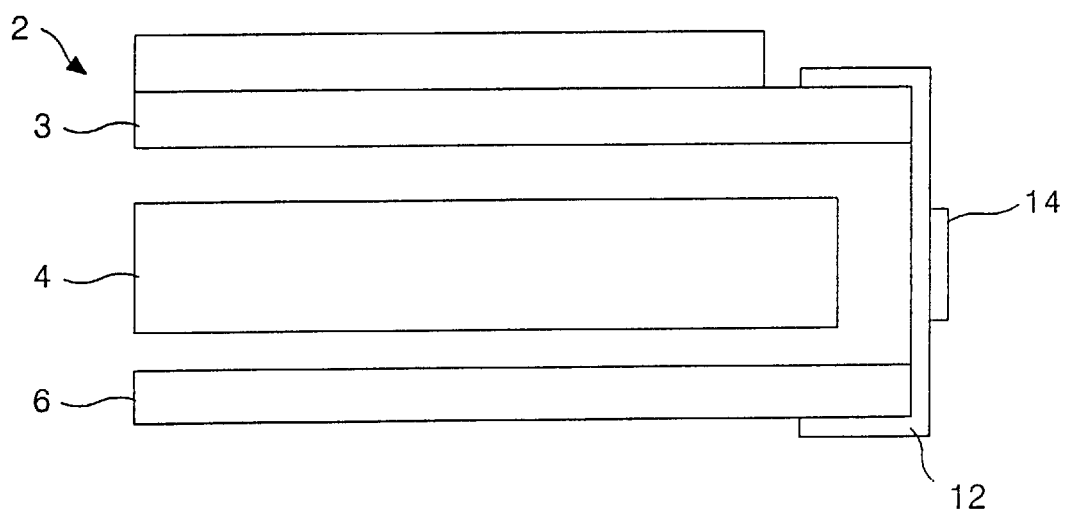
FIG. 2 is a sectional view showing the structure of a liquid crystal display employing the conventional tape automated bonding system.
Figure 3:
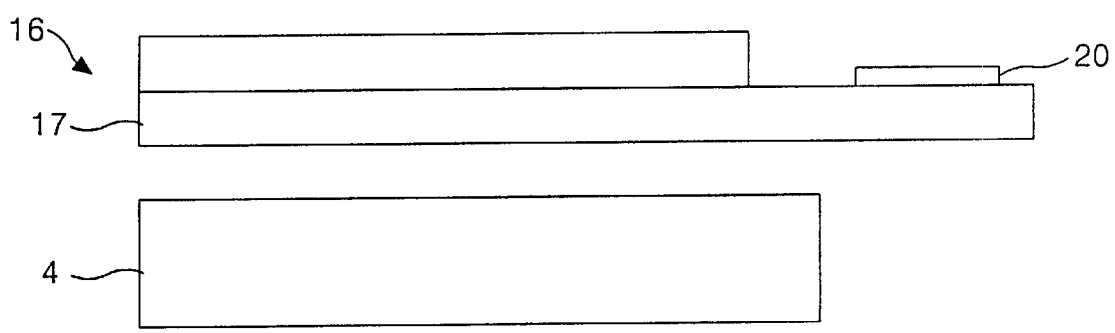
FIG. 3 is a sectional view showing the structure of a liquid crystal display employing the conventional chip on glass system.
Figure 4:
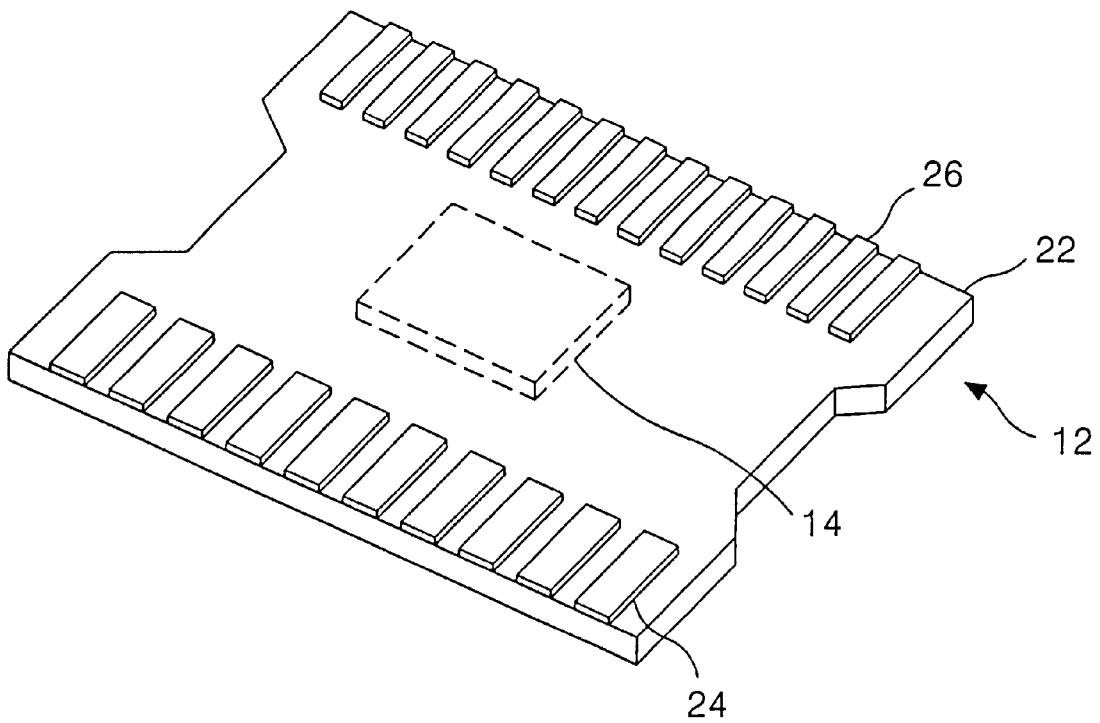
FIG. 4 is a detailed perspective view of the tape carrier package shown in FIG. 2.
Figure 5:
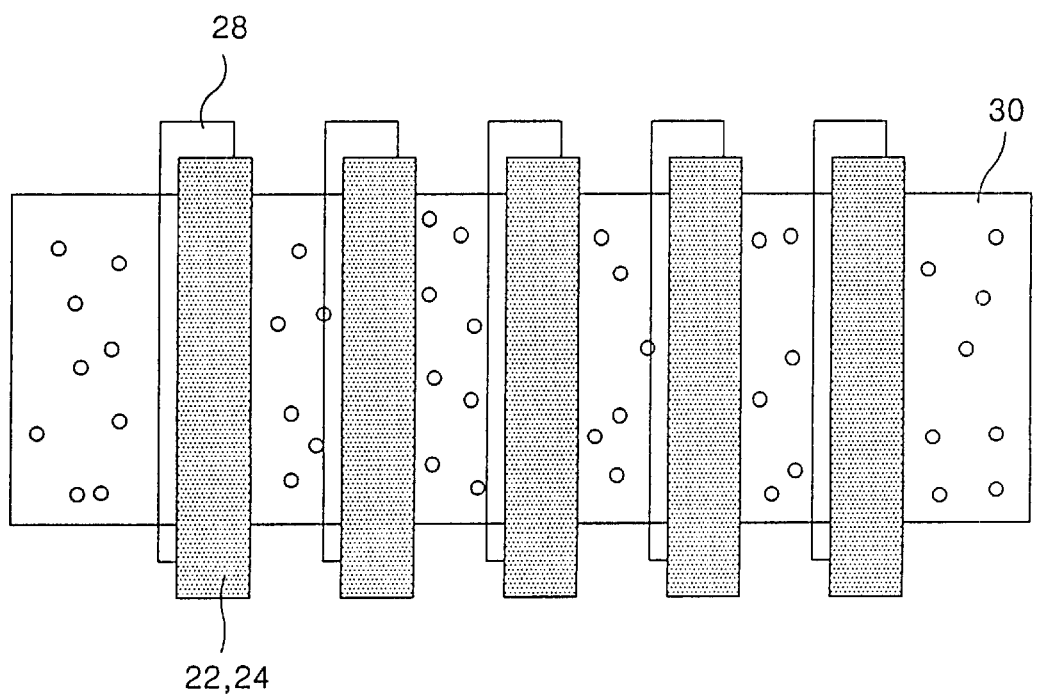
FIG. 5 is a plan view showing a connection state between the input and output pads of the tape carrier package and the pads on the liquid crystal panel or the print wiring board in FIG. 2.
Figure 6:
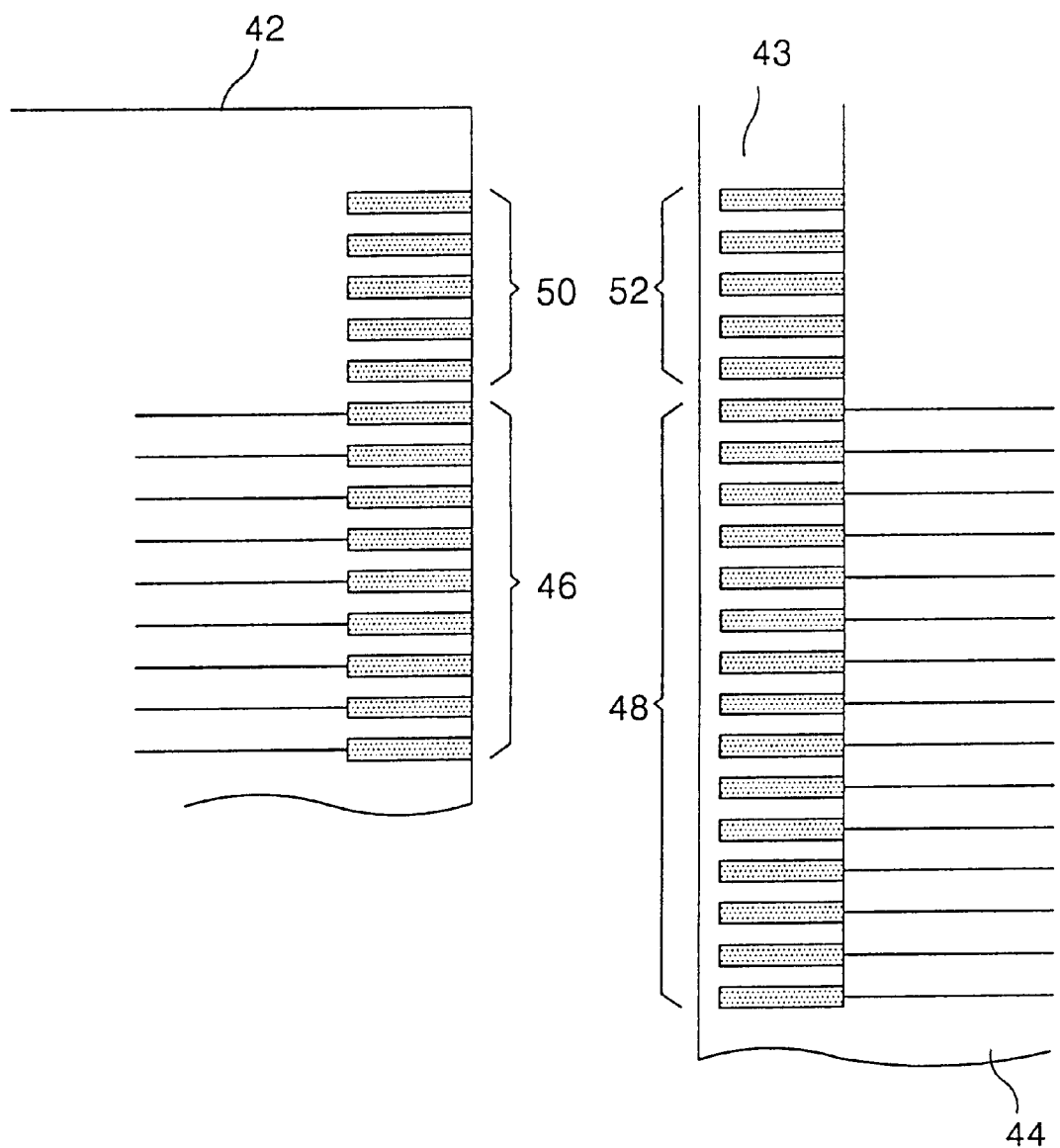
FIG. 6 is a plan view showing the bonding of the tape carrier package and the liquid crystal panel having the conventional dummy pads.
Figure 7:
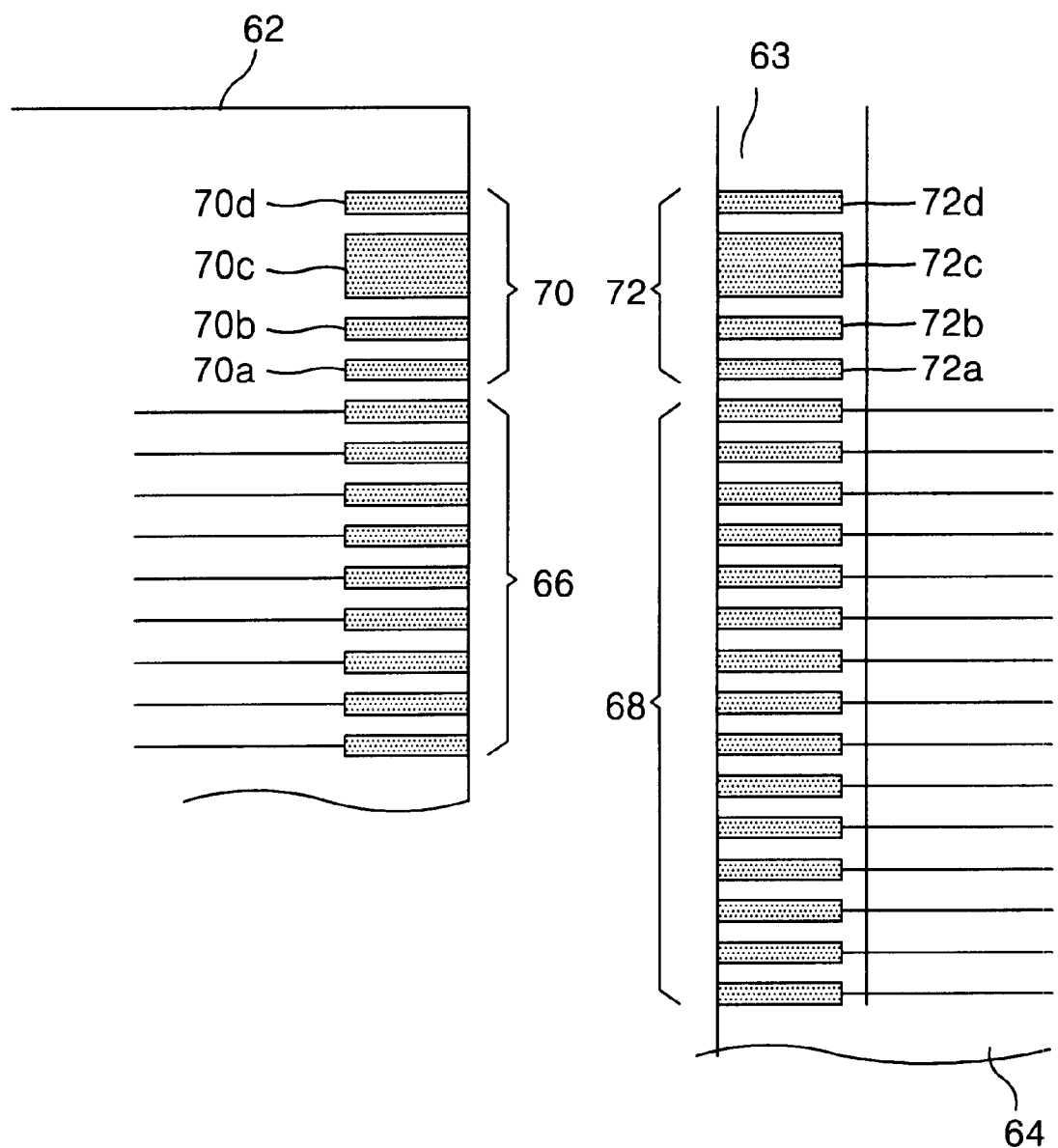
FIG. 7 is a plan view showing the bonding of the tape carrier package and the liquid crystal panel having dummy pads according to an embodiment of the present invention.

Referring to FIG. 7, a TCP 62 and a liquid crystal panel 64 of a liquid crystal display according to an embodiment of the present invention include first and second dummy pad groups 70 and 72, wherein a width of at least one dummy pad in each group set to be different from the widths of output pads 66 and signal pads 68 in such a manner to have a different bonding force. The TCP 62 is provided with output pads 66 connected to a signal wiring in parallel to dummy pads having a different line width. The first dummy pad group 70 of the TCP 62 includes a first dummy pad 70a, a second dummy pad 70b and a fourth dummy pad 70d that have the same line width, and a third dummy pad 70c having a larger line width than the dummy pads 70a, 70b and 70d. The third dummy pad 70c has a larger line width than the first, second and fourth dummy pads 70a, 70b and 70d or the output pads 66. For instance, the third dummy pad 70c is formed to have a line width of more than twice the line width of the first, second and fourth dummy pads 70a, 70b and 70d or the output pads 66. Because the line width of dummy pad 70c is greater, the surface area available for bonding on the TCP 62 is more effectively used.

The liquid crystal panel 64 is provided with signal pads 68 connected to the gate lines and the data lines in parallel to the output pads 66 and the dummy pads 72 of the TCP 62 and the second dummy pad group 72 on a rear glass substrate 63. The second dummy pad group 72 includes a first dummy pad 72a, a second dummy pad 72b and a fourth dummy pad 72d having a small line width to be opposed to the respective pads 70a, 70b and 70d of the first dummy pad group 70, and a third dummy pad 72c having a larger line width than the dummy pads 72a, 72b and 72d. The third dummy pad 72c has a larger line width than the first, second and fourth dummy pads 70a, 70b and 70d or the signal pads 68 like the third dummy pad 70c of the TCP 62. For instance, the third dummy pad 72c is formed to have a line width of more than twice the line width of the first, second and fourth dummy pads 72a, 72b and 72d or the signal pads 68.

Upon bonding of the TCP 62 to the liquid crystal panel 64, the dummy pads 70 and 72 are bonded to each other with the ACF 30 therebetween. If the dummy pads 70 and 72 are bonded in this manner, then the bonding force of each dummy pad becomes different in accordance with the line width thereof. In other words, the first dummy pads 70a and 72a, the second dummy pads 70b and 72b and the fourth dummy pads 70d and 72d have the same bonding force, whereas the third dummy pads 70c and 72c have a larger bonding force than the dummy pads 70a and 72a; 70b and 72b; and 70d and 72d. Those of skill in the art will recognize that it is also possible to provide all dummy terminals with a greater line width than non-dummy terminals. Furthermore, it is also possible to provide a single terminal with an elongated width, such as a single terminal having a width equal to the combined width of terminals 70a–d and the space there between.

As described above, the liquid crystal display according to the present invention includes dummy pads with a different line width in such a manner to have a different bonding force, thereby increasing the bonding force. A method of fabricating a liquid crystal display according to the present invention includes the steps of forming dummy pads with a different line width at both of the TCP and the liquid crystal panel in such a manner that a bonding force exerting on each dummy pad is different, thereby fortifying a bonding force between the TCP and the liquid crystal panel.

Accordingly, a bonding force between the TCP and the liquid crystal panel is increased, so that the liquid crystal display can be normally operated even when subjected to a large impact and force from the exterior thereof.

Although the present invention has been explained in connection with the embodiments shown in the drawings described above, it should be understood by a person of ordinary skill in the art that the invention is not limited to these embodiments, but rather that various changes or modifications thereof are possible without departing from the spirit of the invention. Accordingly, the scope of the invention shall be determined only by the appended claims and their equivalents.

What is claimed is:

1. A liquid crystal display, comprising:
   a tape carrier package including first and second dummy pads to which no signals are applied, the first dummy pad having a larger width than the second dummy pad; and
   a liquid crystal panel including third and fourth dummy pads corresponding to the first and second dummy pads, respectively.

2. The liquid crystal display according to claim 1, wherein one of said dummy pads has a width of more than twice the width of other dummy pads.

3. A liquid crystal display, comprising:
   a tape carrier package including a plurality of output pads for outputting signals from an integrated circuit and at least one first dummy pad to which signals are not applied, the at least one first dummy pad having a width different from a width of the output pads; and a liquid crystal panel including at least one second dummy pad corresponding to said first dummy pad.

4. The liquid crystal display according to claim 3, wherein said first and second dummy pads have a width of more than twice a width of the output pads.

5. A method of fabricating a liquid crystal display comprising the steps of:

providing a liquid crystal panel;

forming a plurality of signal pads on the liquid crystal panel;

forming at least one dummy pad on the liquid crystal panel;

providing a tape carrier package;

forming a plurality of signal pads on the tape carrier package; and forming at least one dummy pad on the tape carrier package;

wherein each dummy pad has a width greater than a width of at least one signal pad.

6. The method of claim 5, wherein the width of each dummy pad is at least twice the width of the at least one signal pad.

7. The method of claim 5, further comprising the steps of forming additional dummy pads on the tape carrier package and the liquid crystal panel.

8. The method of claim 7, wherein widths of the additional dummy pads are greater than widths of the dummy pads.

9. The method of claim 7, wherein widths of the additional dummy pads are equal to widths of the dummy pads.

* * * * *